(12) United States Patent
Nagel et al.

(10) Patent No.: US 10,316,718 B2
(45) Date of Patent: Jun. 11, 2019

(54) EXHAUST GAS CLEANING COMPONENT FOR CLEANING THE EXHAUST GASES OF AN INTERNAL COMBUSTION ENGINE

(71) Applicant: CONTINENTAL AUTOMOTIVE GmbH, Hannover (DE)

(72) Inventors: Thomas Nagel, Engelskirchen (DE); Frank Bohne, Sülzetal (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/544,810

(22) PCT Filed: Jan. 21, 2016

(86) PCT No.: PCT/EP2016/051269
§ 371 (c)(1),
(2) Date: Jul. 19, 2017

(87) PCT Pub. No.: WO2016/116579
PCT Pub. Date: Jul. 28, 2016

(65) Prior Publication Data
US 2018/0003096 A1    Jan. 4, 2018

(30) Foreign Application Priority Data

Jan. 23, 2015   (DE) .................. 10 2015 201 193

(51) Int. Cl.
*F01N 3/10*     (2006.01)
*F01N 3/20*     (2006.01)
(Continued)

(52) U.S. Cl.
CPC ........... *F01N 3/2066* (2013.01); *F01N 3/106* (2013.01); *F01N 3/2026* (2013.01); *F01N 3/281* (2013.01);
(Continued)

(58) Field of Classification Search
USPC ......... 60/274, 286, 287, 289, 295, 297, 300, 60/301, 303
See application file for complete search history.

(56) References Cited

U.S. PATENT DOCUMENTS 4,478,177 A  * 10/1984  Valdespino ............. F02B 43/10
                                                    123/1 A
5,992,141 A  * 11/1999  Berriman ................ B01D 53/56
                                                    60/274

(Continued)

FOREIGN PATENT DOCUMENTS

DE    10 2008 001212    10/2009
DE    10 2010 034705    2/2012
(Continued)

OTHER PUBLICATIONS

Office Action dated Aug. 22, 2018 issued in Korean Patent Application No. 10-2017-7020441.

*Primary Examiner* — Binh Q Tran
(74) *Attorney, Agent, or Firm* — Cozen O'Connor

(57) ABSTRACT

An exhaust gas cleaning component, having a housing with an inflow port and an outflow port, a first honeycomb structure in the housing with a casing, the casing having an outer surface over which exhaust gas can flow, and also having an applicator device by which an exhaust gas cleaning additive can be applied to the outer surface of the casing.

10 Claims, 5 Drawing Sheets

(51) Int. Cl.
*F01N 3/28* (2006.01)
*F01N 3/36* (2006.01)
*F01N 13/00* (2010.01)

(52) U.S. Cl.
CPC ............. *F01N 3/2828* (2013.01); *F01N 3/36* (2013.01); *F01N 13/008* (2013.01); F01N 2240/00 (2013.01); F01N 2240/02 (2013.01); F01N 2240/16 (2013.01); F01N 2410/00 (2013.01); F01N 2470/08 (2013.01); F01N 2470/18 (2013.01); F01N 2560/025 (2013.01); F01N 2560/06 (2013.01); F01N 2610/02 (2013.01); F01N 2610/03 (2013.01); F01N 2610/102 (2013.01); F01N 2610/1453 (2013.01); Y02A 50/2325 (2018.01); Y02T 10/24 (2013.01); Y02T 10/26 (2013.01)

(56) References Cited

U.S. PATENT DOCUMENTS

| | | | |
|---|---|---|---|
| 6,444,177 B1 | 9/2002 | Mueller et al. | |
| 8,793,978 B2 * | 8/2014 | Amstutz | F01N 3/2066 30/303 |
| 9,057,312 B2 * | 6/2015 | Munnannur | F01N 3/2892 |
| 9,435,241 B2 * | 9/2016 | Nakano | F01N 3/2066 |
| 10,012,124 B2 * | 7/2018 | Sandberg | B01D 53/9477 |
| 2003/0101713 A1 | 6/2003 | Dalla Betta et al. | |
| 2010/0263352 A1 | 10/2010 | Hylands et al. | |
| 2011/0107743 A1 | 5/2011 | Ranganathan et al. | |
| 2012/0047882 A1 * | 3/2012 | Kidokoro | F01N 3/103 60/301 |
| 2014/0216030 A1 | 8/2014 | Cockle et al. | |
| 2014/0352285 A1 | 12/2014 | Obenaus | |
| 2017/0234183 A1 * | 8/2017 | Harinath | F01N 3/2066 60/295 |

FOREIGN PATENT DOCUMENTS

| | | |
|---|---|---|
| EP | 1857648 | 11/2007 |
| EP | 2865858 | 4/2015 |
| JP | 2006-501390 | 1/2006 |
| JP | 38-46355 | 11/2006 |
| JP | 2011-241705 | 12/2011 |
| WO | WO 2012/073068 | 6/2012 |

* cited by examiner

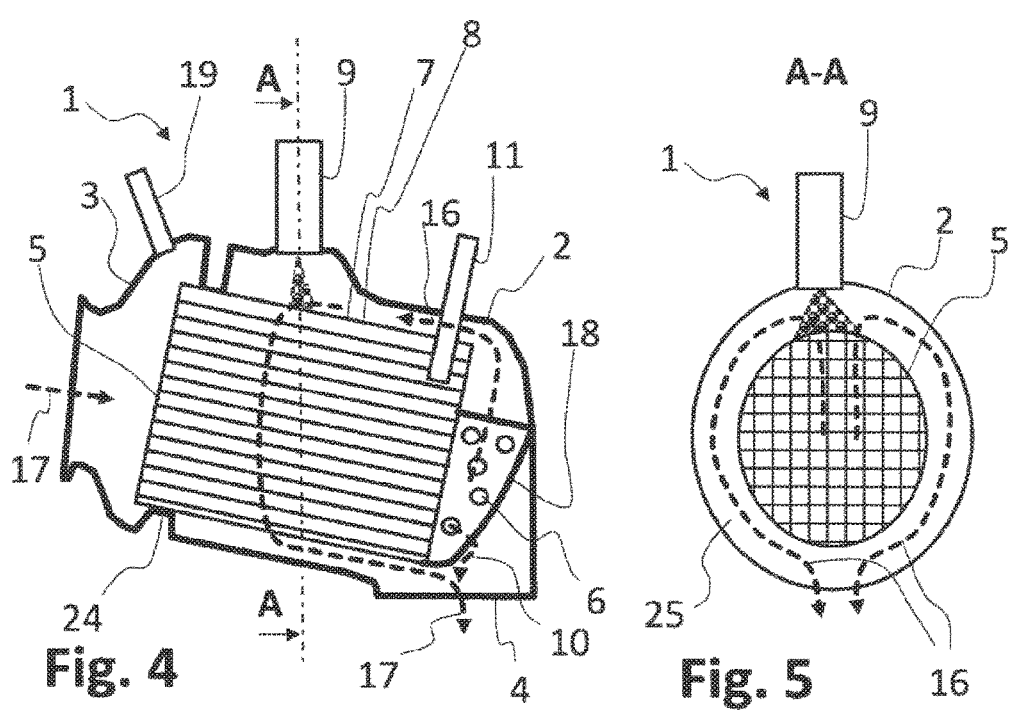

EXHAUST GAS CLEANING COMPONENT FOR CLEANING THE EXHAUST GASES OF AN INTERNAL COMBUSTION ENGINE

CROSS REFERENCED TO RELATED APPLICATIONS

This is a U.S. national stage of application No. PCT/EP2016/051269, filed on Jan. 21, 2016. Priority is claimed on German Application No. DE102015201193.3, filed Jan. 23, 2015, the content of which is incorporated here by reference.

BACKGROUND OF THE INVENTION

1. Field of the Invention

Exhaust gas cleaning component for cleaning the exhaust gases of an internal combustion engine.

The invention relates to an exhaust gas cleaning component for cleaning the exhaust gases of an internal combustion engine, which component is used to feed a liquid exhaust gas cleaning additive to an exhaust gas treatment device. In particular, the exhaust gas cleaning component is a segment of an exhaust line of an exhaust gas treatment device that can be inserted into an exhaust line of an exhaust gas treatment device or that forms a segment of an exhaust line.

2. Description of the Prior Art

Fuel or a reducing agent, for example, is fed to an exhaust gas treatment device as an exhaust gas cleaning additive for carrying out the method of selective catalytic reduction (SCR). In this SCR method, nitrogen oxide components in the exhaust gas are reduced to harmless substances with the aid of the reducing agent. The reducing agent is typically an aqueous urea solution, which can be converted to ammonia in the exhaust gas. The nitrogen oxide compounds in the exhaust gas then react with the ammonia to form harmless substances (in particular $CO_2$, $H_2O$ and $N_2$). A 32.5% aqueous urea solution can be obtained as a liquid exhaust gas cleaning additive under the trade name AdBlue®.

In feeding liquid exhaust gas cleaning additives to the exhaust gas of an internal combustion engine, one problem in particular is that liquid exhaust gas cleaning additives must evaporate in order to be able to act in the exhaust gas in the exhaust gas treatment device. One known practice is for liquid additives to be added in finely atomized form in order to improve the evaporation of the liquid exhaust gas cleaning additives. Another known practice is to provide hot impact structures within an exhaust gas treatment device, on which exhaust gas cleaning additives impinge so as to evaporate from there. However, the provision in an exhaust gas treatment device of corresponding impact surfaces which already have sufficiently high temperatures at an early stage after an internal combustion engine is put into operation so as to ensure reliable evaporation of the liquid exhaust gas cleaning additive is problematic. This applies especially to aqueous urea solution as a liquid exhaust gas cleaning additive.

EP 2865 858 A1 discloses a device and a method for treating exhaust gas. Here, a catalytic converter is arranged in an exhaust line. An injector, by which a substance can be injected into the exhaust line, is furthermore provided. Moreover, the device has a bypass line, which bypasses part of the catalytic converter. Injection of the substance can take place in this bypass line, for example.

EP 1 857 648 A1 shows a device and a method for improving the control of emissions from an internal combustion engine. The device has a nitrogen oxide storage unit and a fuel processor. Here, the fuel processor is arranged upstream of the nitrogen oxide storage unit. In the fuel processor, fuel can be converted into a gas with a reducing effect, the gas being fed into the nitrogen oxide storage unit and leading there to regeneration of the adsorber in the nitrogen oxide storage unit.

US 2010/0 263 352 A1 discloses an exhaust system having a catalyst assembly. Here, a first catalyst is a methane oxidizing catalyst and a second catalyst is a selective catalyst. The first catalyst is arranged upstream of the second catalyst.

U.S. Pat. No. 6,444,177 B1 shows a process and a device for catalytically cleaning an exhaust gas produced by combustion. The exhaust gas to be cleaned is introduced into a conversion and mixing line, wherein the exhaust gas flows through the line. Moreover, a reducing agent is injected into the exhaust gas. The exhaust gas is then deflected into a reduction line, which is arranged parallel to or coaxially around the conversion and mixing line. In the reduction line, the exhaust gas flow flows in a direction counter to the conversion and mixing line.

A known method for improving the evaporation of liquid exhaust gas cleaning additives in exhaust gas treatment devices also comprises, for example, heating systems within the exhaust gas treatment device, by which the exhaust gas or the impact structures described further above can be selectively heated. Heating systems are advantageous, in particular, for achieving adequate evaporation of exhaust gas cleaning additives during the cold starting phase of an internal combustion engine, when it is not yet possible to ensure adequate evaporation by the temperature of the exhaust gases alone.

One problem, in particular, with the addition of liquid exhaust gas cleaning additives is the formation of deposits, which, where aqueous urea solution is used as the exhaust gas cleaning additive, can form especially in the form of solid urea deposits if the aqueous urea solution does not evaporate sufficiently.

SUMMARY OF THE INVENTION

On this basis, it is an object of one aspect of the invention under consideration here to solve or at least mitigate the technical problems described. In particular, the intention is to present a particularly advantageous exhaust gas cleaning component by which a liquid exhaust gas cleaning additive can be fed to an exhaust gas treatment device, wherein adequate evaporation of liquid exhaust gas cleaning additive takes place in the exhaust gas treatment device. Adequate evaporation is achieved by the invention, in particular also under cold starting conditions of an internal combustion engine and with the minimum possible usage of heating energy.

The invention relates to an exhaust gas cleaning component, having a housing with an inflow port and an outflow port, a first honeycomb body arranged in the housing and having a shell, wherein the shell has an outer surface, over which exhaust gas can flow within the housing, and furthermore having a feed device, by which an exhaust gas cleaning additive can be fed onto the outer surface of the shell.

In particular, the exhaust gas cleaning component is any desired segment of an exhaust line, wherein the housing then forms the wall of the exhaust line. The exhaust gas cleaning component can be connected to further segments of an exhaust line via the inflow port or the outflow port and integrated in this way into an exhaust gas treatment device. Here, an exhaust gas flow direction is always defined as a flow direction of the exhaust gas from the inflow port of the housing to the outflow port of the housing.

In particular, the honeycomb body arranged in the housing is a metal honeycomb body, which can be produced from metal films, for example, wherein, in particular, corrugated and smooth metal films can be stacked alternately on one another in order to form a honeycomb duct structure in the honeycomb body. However, it is also possible for the honeycomb body to be a ceramic honeycomb body, which can be produced by extrusion, for example. In particular, the shell is formed by an encircling wall surrounding the honeycomb body in the manner of a circumferential surface. The honeycomb body preferably has an inflow area, via which exhaust gas can flow into the honeycomb body, and an outflow area, via which exhaust gas can re-emerge from the honeycomb body. The shell extends between the inflow area and the outflow area and forms a boundary of the honeycomb body. In the case of a metal honeycomb body, the shell is preferably in the form of a metal tube, which has a greater wall thickness than the metal films by which the honeycomb structure of the honeycomb body is formed. For example, the metal films have a thickness of between 20 µm [micrometers] and 100 µm, while the shell of the honeycomb body has a thickness of between 500 µm and 2 mm [millimeters]. The shell thus also confers mechanical stability upon the honeycomb body. A metal shell of this kind can also be provided in the case of a ceramic honeycomb body. However, a metal honeycomb body is preferred for the exhaust gas cleaning component because, in the case of a metal honeycomb body, there is normally better heat transfer from the honeycomb structure of the honeycomb body toward the shell and the outer surface of the shell. Such heat transfer is desired in the case of the exhaust gas cleaning component to ensure that exhaust gas cleaning additive impinging on the outer surface evaporates effectively on the outer surface.

In particular, the feed device is an injector having a nozzle, by means of which liquid exhaust gas cleaning additive can be fed in atomized form into the housing of the exhaust gas cleaning component. The injector or nozzle of the feed device preferably passes through the housing of the exhaust gas cleaning component at one point, ensuring that a segment of the feed device is accessible outside the housing and thus that it is possible to connect to the feed device a line via which the feed device can be supplied with the liquid exhaust gas cleaning additive. The feed device or a nozzle of the feed device preferably produces a spray cone, by which the liquid exhaust gas cleaning additive is sprayed in the exhaust gas treatment device. The feed device is preferably aligned in such a way that the spray cone impinges on the outer surface of the shell.

The outer surface of the shell of the honeycomb body is usually heated by virtue of the fact that exhaust gas flows through the honeycomb body. The honeycomb body can be a catalyst substrate (in particular an oxidation catalyst), for example, by which exhaust gas components in the exhaust gas of the internal combustion engine are oxidized. This causes a temperature increase in the honeycomb body when hot exhaust gases flow through the honeycomb body. The honeycomb body therefore heats the shell surface and the outer surface. In addition, the shell surface is generally particularly hot because the shell surface and the outer surface are arranged completely within the housing of the exhaust gas cleaning component in the region of the feed device and are not in direct contact with an outer wall of the housing. Accordingly, a gap between the housing and the shell surface acts as a kind of thermal insulation, which protects the shell surface from cooling. For this reason, the outer surface, over which flow can occur, within a housing allows particularly safe and reliable evaporation of liquid exhaust gas cleaning additive in the exhaust gas cleaning component. In particular, the exhaust gas cleaning component is suitable for feeding in aqueous urea solution as a liquid exhaust gas cleaning additive.

The exhaust gas cleaning component is furthermore advantageous if at least one bypass duct is formed between the outer surface of the shell and the housing, through which duct a partial exhaust gas flow of an exhaust gas flow flowing from the inflow port to the outflow port can bypass the first honeycomb body, wherein the feed device is arranged on the bypass duct, allowing the exhaust gas cleaning additive to be fed into the bypass duct.

In this variant embodiment, the first honeycomb body is embodied in such a way that it does not completely fill a cross-sectional area of the housing. A gap between the first honeycomb body and the housing thus forms the bypass duct described here. Accordingly, the exhaust gas flow that enters the housing at the inflow port is divided into a main exhaust gas flow and a partial exhaust gas flow, wherein the main exhaust gas flow flows through the first honeycomb body, while the partial exhaust gas flow flows through the bypass described. During this process, the partial exhaust gas flow described flows over the outer surface of the shell. The liquid exhaust gas cleaning additive, which is fed into the exhaust gas treatment component by the feed device, thus initially comes into contact only with the partial exhaust gas flow. The partial exhaust gas flow and the main exhaust gas flow are then combined again (after the first honeycomb body in an exhaust gas flow direction). Dividing the exhaust gas flow into a main exhaust gas flow and a partial exhaust gas flow, in which the liquid exhaust gas cleaning additive is fed in, makes it possible to influence the partial exhaust gas flow in a specific manner to enable the feeding of the exhaust gas cleaning additive into the partial exhaust gas flow to take place in a particularly advantageous manner.

The exhaust gas cleaning component is furthermore advantageous if a second honeycomb body, through which the partial exhaust gas flow flowing through the bypass duct flows, is arranged in the bypass duct.

The second honeycomb body is preferably arranged ahead of the feed device in an exhaust gas flow direction. The gap forming the bypass duct is preferably covered completely by the second honeycomb body, thus ensuring that the partial exhaust gas flow flowing through the bypass duct is completely influenced by the second honeycomb body. A second honeycomb body of this kind in the bypass duct ahead of the feed device in the flow direction makes it possible to influence the partial exhaust gas flow in a specific manner. For this purpose, the second honeycomb body can have a catalytically active coating, for example, preferably a coating with an oxidative action. It is also possible for a second honeycomb body to be arranged after the feed device in an exhaust gas flow direction. A second honeycomb body arranged there can have a hydrolytic coating, for example, by which the conversion of liquid exhaust gas cleaning additive can be improved. By means of a hydrolytic coating, the conversion of urea into ammonia can be promoted, for example.

The exhaust gas cleaning component is furthermore advantageous if a heater, by which the partial exhaust gas flow flowing through the bypass duct can be heated, is arranged in the bypass duct ahead of the feed device in the exhaust gas flow direction.

For the successful evaporation of exhaust gas cleaning additive in an exhaust gas treatment device, it is, in particular, the temperature of the exhaust gases in the exhaust gas treatment device which is decisive. Using a heater, the temperature of the exhaust gases ahead of the feed device can be increased in a specific manner. It is particularly advantageous to arrange a heater in a bypass duct because this makes it possible to heat just a partial exhaust gas flow flowing through the bypass duct. This reduces the heating energy required by the heater.

In particular, the heater is an electric heater, which can be embodied as an electrically heatable honeycomb body. An electrically heatable honeycomb body of this kind can be formed from a pack of corrugated and smooth metal films through which electric current flows, for example. However, the heater can also be any other heater, e.g. a heat exchanger or a burner.

A heater in the bypass duct interacts in a particularly advantageous manner with the outer surface of a shell of the first honeycomb body as an impact surface for the liquid exhaust gas cleaning additive because the temperature required for adequate evaporation of the liquid exhaust gas cleaning additive can be achieved either with the exhaust gases or with the heater. This allows particularly economical operation of the heater, the heater generally being activated only when a sufficient temperature cannot be achieved by the exhaust gases.

The exhaust gas cleaning component is furthermore advantageous if a surface heating system, by which the outer surface of the shell can be heated, is arranged in an impact region of the outer surface of the shell, in which exhaust gas cleaning additive fed in by the feed device impinges.

A surface heating system of this kind can be implemented in the form of electric conductor tracks arranged on the outer surface of the shell. A surface heating system of this kind can be used to selectively heat the shell if a sufficient temperature increase is not ensured by the exhaust gases flowing into the exhaust gas cleaning component.

Conductor tracks can be printed or adhesively bonded onto the shell, for example.

The exhaust gas cleaning component is furthermore advantageous if a heater, by which both a partial exhaust gas flow flowing through the bypass duct and a main exhaust gas flow, flowing through the first honeycomb body, of the exhaust gas flow can be heated, is arranged ahead of the bypass duct and the first honeycomb body in an exhaust gas flow direction.

A common heater of this kind preferably spans the entire cross-sectional area of the housing. A common heater of this kind is advantageous particularly when a minimum temperature is also required for the catalytic processes taking place in the first honeycomb body. The heater can then be used to increase the temperature of the exhaust gases of the main exhaust gas flow as well.

The exhaust gas cleaning component is furthermore advantageous if the first honeycomb body is arranged in such a way that all of an exhaust gas flow flowing into the exhaust gas cleaning component through the inflow port flows through the first honeycomb body, wherein the exhaust gas cleaning component furthermore has at least one deflection device, by which an exhaust gas flow flowing out of the first honeycomb body is deflected in such a way that there is flow over the outer surface of the shell.

In particular, the deflection device is a baffle plate, which is arranged in the housing and deflects the exhaust gases emerging from the first honeycomb body. In this variant embodiment of the exhaust gas cleaning component, there is no division of the exhaust gas flow into a main exhaust gas flow and a partial exhaust gas flow ahead of the first honeycomb body. On the contrary, all of the exhaust gas flow flows through the first honeycomb body. It is only after this that the exhaust gas flow is deflected by the at least one baffle plate in such a way that the exhaust gas flow is guided toward the outer surface of the shell. This makes it possible to ensure that the exhaust gas flowing along the outer surface has already been influenced by the first honeycomb body before it flows over the outer surface of the shell. In particular, this is advantageous if a temperature increase in the exhaust gas is achieved in the first honeycomb body.

There is then preferably an annular space around the honeycomb body, via which the exhaust gas that has flowed over the outer surface of the shell is deflected toward the outflow port.

There is furthermore preferably an encircling seal by which the housing rests on the shell surface of the honeycomb body and by means of which the honeycomb body is held in the housing. A seal of this kind can be formed by an encircling bead on the housing.

The exhaust gas cleaning component is furthermore advantageous if at least one bypass duct, through which a partial exhaust gas flow of the exhaust gas flow flowing out of the first honeycomb body can flow to an outflow port of the housing without flowing over the outer surface of the shell, is formed on the at least one deflection device.

A bypass of this kind can be provided in the form of a perforation in the baffle plate. A bypass of this kind after the first honeycomb body makes it possible to ensure that it is not the entire exhaust gas flow that flows past the outer surface and the feed device of the exhaust gas cleaning component. This is expedient particularly if excessively high flow velocities would occur at the outer surface and at the feed device as a result. Such excessively high flow velocities could lead to excessively short dwell times of the liquid exhaust gas cleaning additive fed in on the shell surface, with the result that the liquid exhaust gas cleaning additive would not evaporate completely here. The bypass thus acts in the manner of a regulating system, by which the speed and pressure of the exhaust gas flow which flows over the outer surface of the shell at the feed device are regulated.

A description will also be given here of a motor vehicle, having an internal combustion engine and an exhaust gas treatment device for cleaning the exhaust gases of the internal combustion engine, by means of at least one exhaust gas cleaning component of the type described here.

Arranged after the exhaust gas cleaning component in the exhaust gas flow direction, in the exhaust gas treatment device, there is preferably an SCR catalyst, wherein the method of selective catalytic reduction can be carried out by the SCR catalyst and the exhaust gas cleaning additive fed in via the exhaust gas cleaning component.

BRIEF DESCRIPTION OF THE DRAWINGS

The invention and the technical field are explained in greater detail below by means of the figures. The figures show particularly preferred illustrative embodiments, although the invention is not restricted thereto. In particular, attention should be drawn to the fact that the figures and, especially, the size ratios depicted in the figures are only schematic. In the figures:

FIG. 4 is an exhaust gas cleaning component described;
FIG. 5 is a cross section through the exhaust gas cleaning component described.

DETAILED DESCRIPTION OF THE PRESENTLY PREFERRED EMBODIMENTS

Figure 1:
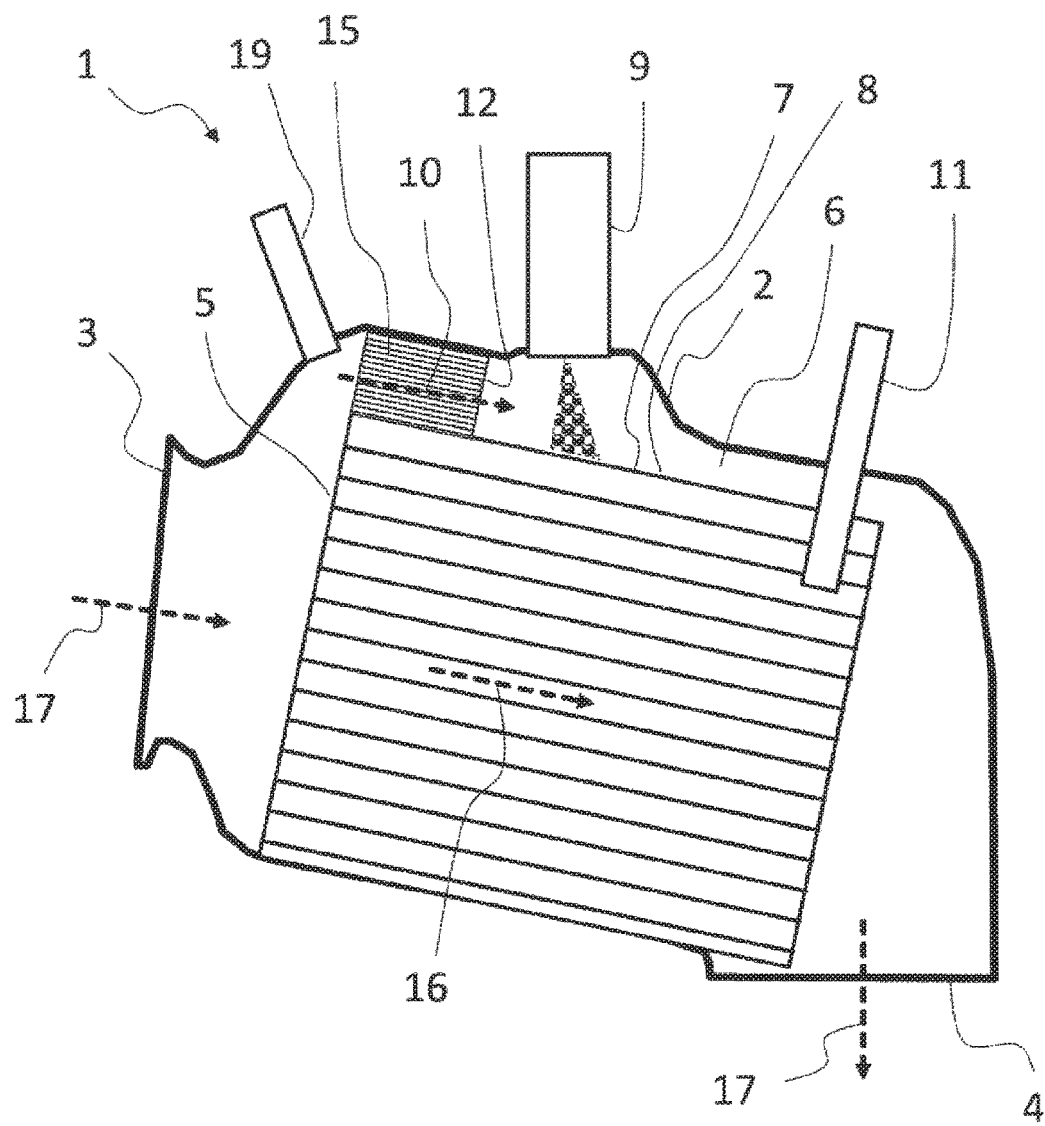
FIG. 1 is an exhaust gas cleaning component described.

FIGS. 1 to 4 each illustrate different variant embodiments of the exhaust gas cleaning component 1 described. All the exhaust gas cleaning components 1 illustrated have a housing 2 with an inflow port 3, through which an exhaust gas flow 17 can flow into the exhaust gas cleaning component 1, and an outflow port 4, through which the exhaust gas flow 17 can flow out of the exhaust gas cleaning component 1. A first honeycomb body 5, through which the exhaust gas can flow, is arranged in each of the exhaust gas cleaning components 1.

Also provided in each case is a feed device 9, by which liquid exhaust gas cleaning additive can be fed onto an outer surface 8 of a shell 7 of the first honeycomb body 5. The variant embodiments of the exhaust gas cleaning component in FIGS. 1 and 4 furthermore each show, by way of example, a lambda sensor 19 and a temperature sensor 11, by which the functions of the exhaust gas cleaning component 1 can be monitored. In this case, the lambda sensor 19 is arranged ahead of the first honeycomb body 5 in an exhaust gas flow direction from the inflow port 3 to the outflow port 4. The temperature sensor 11 extends through the housing 2 into the first honeycomb body 5 in order to be able to monitor the temperature in the first honeycomb body 5. The lambda sensor 19 monitors the lambda value in a region of the exhaust gas cleaning component 1 ahead of the first honeycomb body 5. Both the lambda sensor 19 and the temperature sensor 11 are illustrated only by way of example in FIGS. 1 and 4 and are intended to illustrate the fact that a person skilled in the art can arrange any desired sensors on the exhaust gas cleaning component 1. The exhaust gas cleaning component according to the invention does not require these sensors. However, these sensors can also be transferred to the illustrative embodiments shown in FIGS. 2 and 3.

Figure 2:
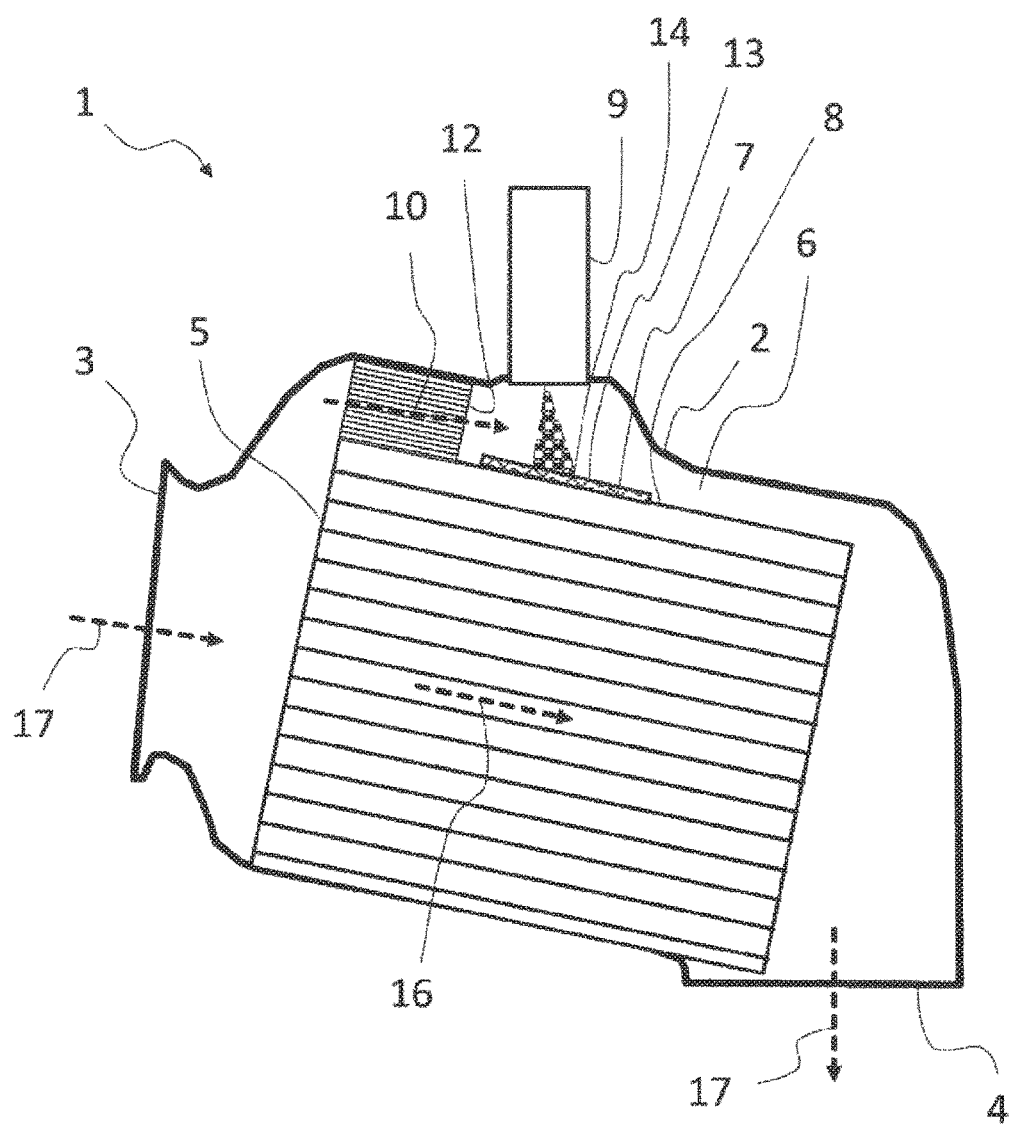
FIG. 2 is an exhaust gas cleaning component described.
Figure 3:
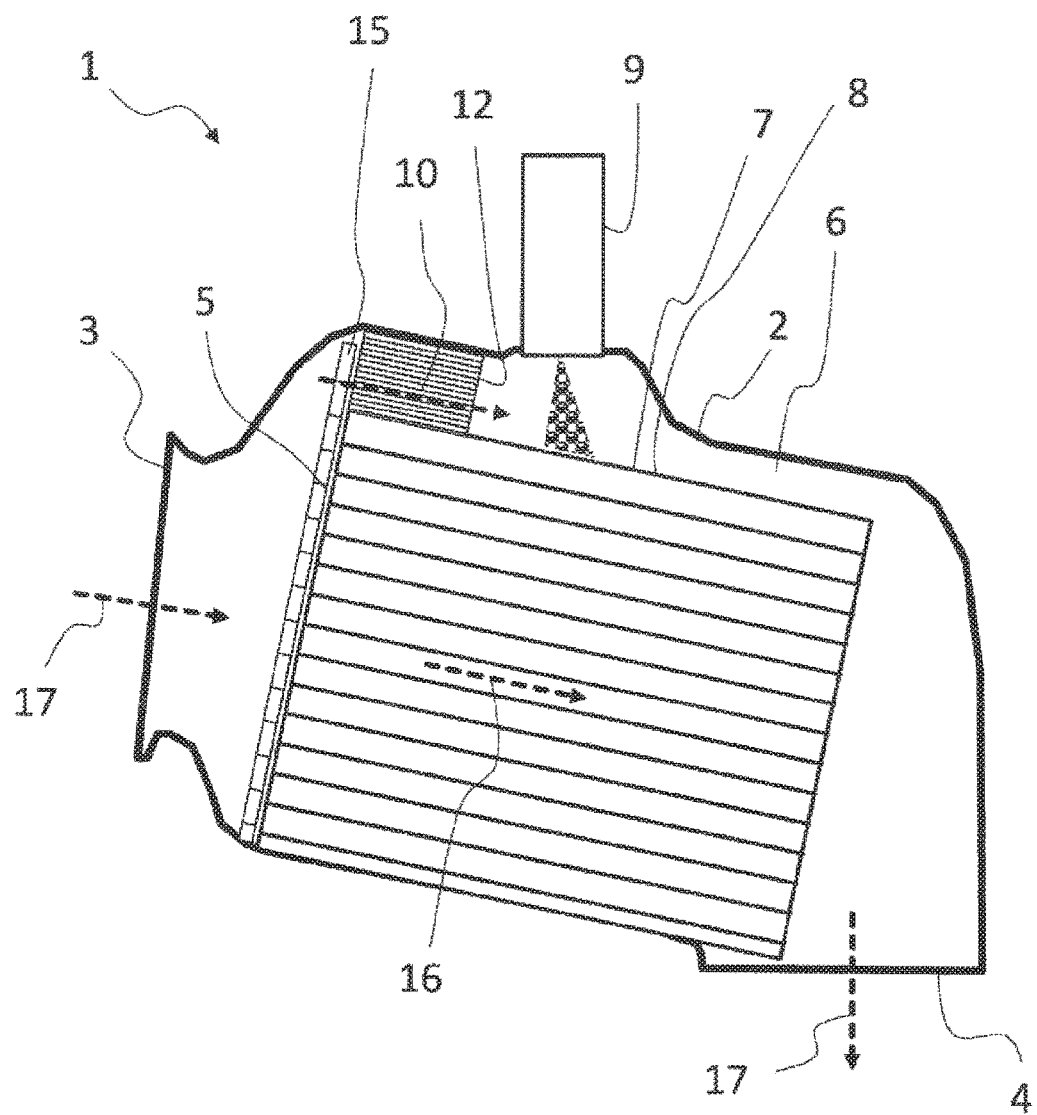
FIG. 3 is an exhaust gas cleaning component described.

Provided in each of FIGS. 1 to 3 is a bypass duct 6, which extends between the outer surface 8 of the shell 7 of the first honeycomb body 5 and the housing 2 and through which a partial exhaust gas flow 10 of the exhaust gas flow 17 flows. In each case, a main exhaust gas flow 16 flows through the first honeycomb body 5. The exhaust gas flow 17 is divided by the first honeycomb body 5 into the partial exhaust gas flow 10 and the main exhaust gas flow 16. The bypass duct 6 is formed by a gap between the first honeycomb body 5 and the housing 2 and between the shell 7 and the housing 2.

According to FIG. 1, a second honeycomb body 12 is provided in the bypass duct 6 ahead of the feed device 9 in the exhaust gas flow direction. FIG. 1 shows by way of example that this second honeycomb body 12 is a heater 15, by which the partial exhaust gas flow 10 that flows through the bypass 6 can be heated. However, the second honeycomb body 12 can also be a "conventional" catalyst substrate having a catalytically active coating, which causes a temperature increase in the partial exhaust gas flow 10.

According to FIG. 2, a second honeycomb body 12 is likewise arranged ahead of the feed device 9 in the bypass duct 6. Here, however, there is additionally a surface heating system 14, which is arranged on the outer surface 8 of the shell 7, in an impact region 13. In this impact region, the liquid exhaust gas cleaning additive added by means of the feed device 9 impinges on the outer surface 8 of the shell 7. This surface heating system 14 can be embodied as an electric heating system, for example, which is formed by electric conductor tracks on the outer surface 8 of the shell 7. Here, such conductor tracks can be printed or adhesively bonded on, for example. In particular, such conductor tracks should be resistant to high temperatures so that they are not damaged by the temperatures in the exhaust gas cleaning component.

According to the variant embodiment in FIG. 3, a second honeycomb body 12 is likewise arranged in the bypass duct 6. According to FIG. 3, there is furthermore a heater 15, which extends over the entire cross section of the housing 2 and which thus covers both the bypass duct 6 (through which the partial exhaust gas flow 10 flows) and the first honeycomb body 5 (through which the main exhaust gas flow 15 flows). As a result, both the main exhaust gas flow 16 and the partial exhaust gas flow 10 are heated by the heater 15. This heater 15 too can preferably be embodied as an electrically heatable honeycomb body.

Together with FIG. 5, FIG. 4 shows an alternative embodiment of the exhaust gas cleaning component 1, in which the exhaust gas flow 17 is not initially divided into a main exhaust gas flow and a partial exhaust gas flow (before flowing through the first honeycomb body 5). On the contrary, the first honeycomb body 5 is sealed off at the housing 2 by a seal 24, which is here embodied as an encircling bead on the housing 2. This seal 24 embodied as an encircling bead rests on the shell surface 7 of the first honeycomb body 5 and is sealed off there. The seal 24 embodied as a bead also fixes the first honeycomb body 5 mechanically within the housing 2. After the exhaust gas flows out of the first honeycomb body 5, the exhaust gas is deflected by a deflection device 18, with the result that it is guided toward the outer surface 8 of the shell 7. During this process, the exhaust gas also flows over a region of the outer surface 8 of the shell 7 in which exhaust gas cleaning additive is fed onto the outer surface 8 of the shell 7 by means of the feed device 9.

FIG. 5 shows a section through FIG. 4 along section line A-A. It can be seen in FIG. 5 that there is an annular space 25 around the outside of the first honeycomb body 5 or between the first honeycomb body 5 and the housing 2, through which space the deflected exhaust gas can be guided in the direction of the outflow port 4 (illustrated in FIG. 4) of the exhaust gas cleaning component 1.

Here, the seal 24 embodied as a bead holds the first honeycomb body 5 firmly in the housing 2 and closes off the annular space 25 from the inflow port 3 of the exhaust gas cleaning component 1. In the variant embodiment of the exhaust gas cleaning component 1 shown in FIGS. 4 and 5, a bypass 6 is furthermore provided after the first honeycomb body 5, through which bypass a partial exhaust gas flow 10 can flow out without flowing to the feed device 9. In this variant embodiment, a main exhaust gas flow 16 flows to the feed device 9. This distinguishes the variant embodiment shown in FIGS. 4 and 5 from the variant embodiments shown in FIGS. 1 to 3. This bypass duct 6 can be in the form of a perforation of the deflection device 18. This bypass duct 6 is just one special variant embodiment, which does not have to be present in the illustrative embodiment shown in FIGS. 4 and 5.

Figure 6:
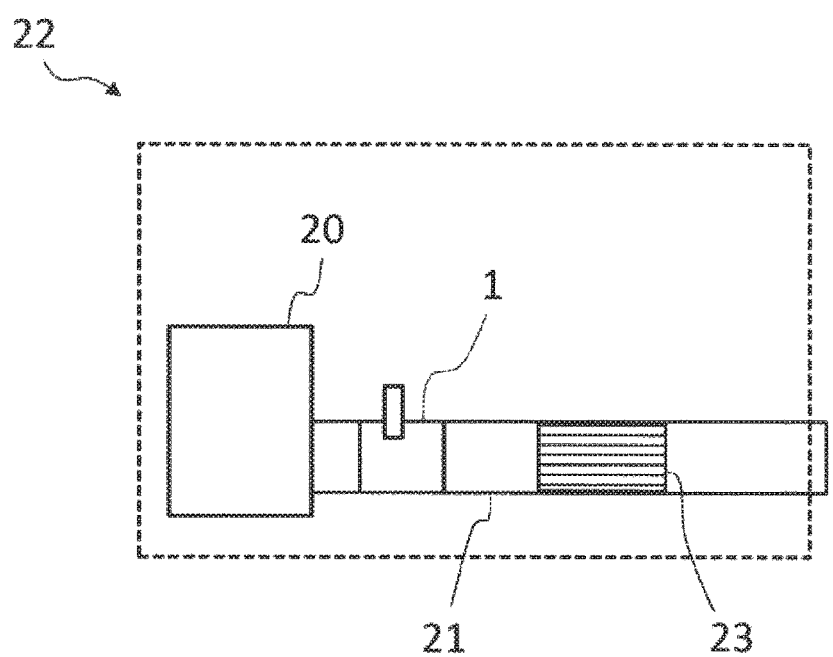
FIG. 6 is a motor vehicle having an exhaust gas cleaning component described.

FIG. 6 shows a motor vehicle 22 having an internal combustion engine 20 and an exhaust gas treatment device 21, by means of which the exhaust gases of the internal combustion engine 20 are cleaned. The exhaust gas treatment device 21 has an exhaust gas cleaning component 1 of the type described here. In addition, the exhaust gas treatment device 21 has an SCR catalyst 23, by which the method of selective catalytic reduction can be carried out with the aid of an exhaust gas cleaning additive, wherein the exhaust gas cleaning additive is fed to the exhaust gas treatment device 21 with the aid of the exhaust gas cleaning component 1 described.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An exhaust gas cleaning component, comprising:
a housing with an inflow port and an outflow port;
a first honeycomb body arranged in the housing;
a shell of the first honeycomb body having an outer surface over which exhaust gas can flow within the housing;
a feed device configured to feed an exhaust gas cleaning additive onto the outer surface of the shell;
at least one bypass duct formed between the outer surface of the shell and the housing through which duct a partial exhaust gas flow of an exhaust gas flow flowing from the inflow port to the outflow port can bypass the first honeycomb body,
wherein the feed device is arranged at the at least one bypass duct and configured so that the exhaust gas cleaning additive is fed into the at least one bypass duct; and
a second honeycomb body, through which the partial exhaust gas flow flowing through the at least one bypass duct flows, is arranged in the at least one bypass duct upstream of the feed device in an exhaust gas flow direction.

2. The exhaust gas cleaning component as claimed in claim 1, further comprising:
a heater arranged in the at least one bypass duct upstream of the feed device in an exhaust gas flow direction and configured to heat the partial exhaust gas flow flowing through the at least one bypass duct.

3. The exhaust gas cleaning component as claimed in claim 1, further comprising:
a surface heating system arranged at an impact region of the outer surface of the shell at which the exhaust gas cleaning additive fed by the feed device impinges and configured to heat the outer surface of the shell.

4. The exhaust gas cleaning component as claimed in claim 3, further comprising:
a heater arranged upstream of the at least one bypass duct and the first honeycomb body in an exhaust gas flow direction and configured to heat the partial exhaust gas flow flowing through the at least one bypass duct and a main exhaust gas flow flowing through the first honeycomb body.

5. The exhaust gas cleaning component as claimed in claim 1, further comprising:
a heater arranged upstream of the at least one bypass duct and the first honeycomb body in an exhaust gas flow direction and configured to heat the partial exhaust gas flow flowing through the at least one bypass duct and a main exhaust gas flow flowing through the first honeycomb body.

6. The exhaust gas cleaning component as claimed in claim 1, further comprising:
a heater arranged in the at least one bypass duct upstream of the feed device in the exhaust gas flow direction and configured to heat the partial exhaust gas flow flowing through the at least one bypass duct.

7. The exhaust gas cleaning component as claimed in claim 1, further comprising:
a surface heating system arranged at an impact region of the outer surface of the shell at which the exhaust gas cleaning additive fed by the feed device impinges and configured to heat the outer surface of the shell.

8. An exhaust gas cleaning component, comprising:
a housing with an inflow port and an outflow port;
a first honeycomb body arranged in the housing;
a shell of the first honeycomb body having an outer surface over which exhaust gas can flow within the housing; a feed device configured to feed an exhaust gas cleaning additive onto the outer surface of the shell;
at least one bypass duct formed between the outer surface of the shell and the housing through which duct a partial exhaust gas flow of an exhaust gas flow flowing from the inflow port to the outflow port can bypass the first honeycomb body,
wherein the feed device is arranged at the at least one bypass duct and configured so that the exhaust gas cleaning additive is fed into the at least one bypass duct,
wherein the first honeycomb body is arranged such that all of an exhaust gas flow flowing into the exhaust gas cleaning component through the inflow port flows through the first honeycomb body,
wherein the exhaust gas cleaning component further comprises at least one deflection device, configured to deflect an exhaust gas flow flowing out of the first honeycomb body such that there is flow over the outer surface of the shell.

9. The exhaust gas cleaning component as claimed in claim 8, further comprising:
at least one bypass duct, is formed on the at least one deflection device through which a partial exhaust gas flow of the exhaust gas flow flowing out of the first honeycomb body can flow to an outflow port of the housing without flowing over the outer surface of the shell.

10. A motor vehicle, comprising:

an internal combustion engine; and an exhaust gas treatment device for cleaning exhaust gases of the internal combustion engine by means of an exhaust gas cleaning component comprising:

a housing with an inflow port and an outflow port;

a first honeycomb body arranged in the housing;

a shell of the first honeycomb body having an outer surface over which the exhaust gases can flow within the housing;

a feed device configured to feed an exhaust gas cleaning additive onto the outer surface of the shell;

at least one bypass duct formed between the outer surface of the shell and the housing through which duct a partial exhaust gas flow of an exhaust gas flow flowing from the inflow port to the outflow port can bypass the first honeycomb body, wherein the feed device is arranged at the at least one bypass duct and configured so that the exhaust gas cleaning additive is fed into the at least one bypass duct; and at least one of:

a second honeycomb body, through which the partial exhaust gas flow flowing through the at least one bypass duct flows, is arranged in the at least one bypass duct upstream of the feed device in an exhaust gas flow direction; and at least one deflection device, configured to deflect an exhaust gas flow flowing out of the first honeycomb body such that there is flow over the outer surface of the shell, wherein the first honeycomb body is arranged such that all of an exhaust gas flow flowing into the exhaust gas cleaning component through the inflow port flows through the first honeycomb body.

\* \* \* \* \*